(12) United States Patent
Braat

(10) Patent No.: US 6,317,276 B1
(45) Date of Patent: Nov. 13, 2001

(54) OPTICAL LENS SYSTEM AND SCANNING DEVICE PROVIDED WITH SUCH A SYSTEM

(75) Inventor: Josephus J. M. Braat, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/622,601

(22) PCT Filed: Dec. 20, 1999

(86) PCT No.: PCT/EP99/10204

§ 371 Date: Aug. 18, 2000

§ 102(e) Date: Aug. 18, 2000

(87) PCT Pub. No.: WO00/37982

PCT Pub. Date: Jun. 29, 2000

(30) Foreign Application Priority Data

Dec. 22, 1998 (EP) .................................................. 98204384

(51) Int. Cl.[7] .............................. G02B 9/14; G02B 27/30
(52) U.S. Cl. ............................................. 359/785; 359/641
(58) Field of Search .......................... 359/641, 795–796, 359/785, 708, 716–717

(56) References Cited

U.S. PATENT DOCUMENTS

| Re. 32,988 | * | 7/1989 | Smid ....................... 359/641 |
| 5,475,537 | | 12/1995 | Kobayashi et al. ........... 359/794 |
| 5,818,809 | * | 10/1998 | Arai et al. .................. 369/118 |
| 5,936,782 | * | 8/1999 | Nomura et al. .............. 359/719 |

FOREIGN PATENT DOCUMENTS

0727777A1    8/1996    (EP)    ................. G11B/7/12

* cited by examiner

Primary Examiner—Jordan M. Schwartz
(74) Attorney, Agent, or Firm—Michael E. Belk

(57) ABSTRACT

In a lens system for focusing a divergent beam in a small spot and comprising a collimator lens and an objective lens, the collimator lens is composed of a positive plastics lens element and a negative glass lens element. This collimator corrects the temperature-dependent spherical aberration of the objective lens. This lens system is very suitable for a scanning device and an apparatus for reading/writing high-density optical discs.

8 Claims, 7 Drawing Sheets

OPTICAL LENS SYSTEM AND SCANNING DEVICE PROVIDED WITH SUCH A SYSTEM

BACKGROUND OF THE INVENTION

The invention relates to a lens system for imaging a punctiform radiation source in a diffraction-limited radiation spot in the image plane of the lens system, which system comprises a collimator lens and an objective lens. The invention also relates to an optical scanning device for reading and/or writing information in an information plane, and an apparatus provided with such a device.

Said information plane may be the plane of an optical record carrier in the form of a disc or a tape in which the optically readable information is present or can be stored. Such a record carrier is, for example, the known compact disc (CD) for audio or CD ROM for data or a record carrier derived therefrom, such as the DVD which has a considerably higher storage capacity. The information plane may also be the plane of another object which can be examined, for example, with a scanning microscope.

Notably for optical record carriers, there is a growing need of a scanning device with which increasingly smaller details can still be read in a well separated manner because more and more information is to be stored on the record carrier. The quantity of information which can be stored in an optical record carrier depends, inter alia, on the size of the minimal scanning spot which can be formed by the scanning device on the information plane. As the scanning spot becomes smaller, the information density may become larger. The scanning spot may be reduced by increasing the numerical aperture (NA) to, for example, NA=0.6 at the image side of the objective lens with which this scanning spot is formed. Such an objective lens must be well corrected for various aberrations in order that the scanning spot actually has the desired shape and size.

The objective lens for an optical scanning device must be small and light-weight and therefore preferably consists of a single lens element, one or both refractive surfaces of which are aspherical. An aspherical lens surface is understood to mean a surface whose fundamental shape is regular, for example, spherical or plane, but whose real shape slightly deviates therefrom so as to correct for spherical aberration. Due to the use of the scanning device, namely in consumer apparatuses for, for example, DVDs or DVD-RAMs, a lens element of synthetic material is preferably used for the objective lenses in these apparatuses. A synthetic material lens element is cheaper than a glass lens element and, moreover, has a smaller weight. The problem of a synthetic material lens element is that this element will exhibit spherical aberrations at a change of the temperature, despite the fact that this element is designed in such a way that it is free from spherical aberration at the nominal temperature.

In U.S. Pat. No. 5,474,537, relating to a scanning device for optical records, it is proposed to reduce the spherical aberration due to temperature variations by replacing the collimator lens of a lens system of which also the objective lens forms part by a lens passing a non-parallel, divergent, beam to the objective lens. The relevant lens is referred to as capture lens and is no longer a collimator lens. However, the solution as proposed in U.S. Pat. No. 5,474,537 is not usable in a scanning device or an apparatus in which the objective lens is placed on a movable slide in order to be able to move it rapidly with respect to the record carrier, whereas the collimator lens is stationary. Moreover, since the objective lens is no longer irradiated by a parallel beam, its free working distance is reduced, which is a drawback in practice. The free working distance of an objective lens is understood to mean the distance between the image plane, i.e., for example the information plane of a record carrier, and the surface of the lens located closest to this image plane.

OBJECTS AND BRIEF SUMMARY OF THE INVENTION

It is an object of the invention to provide a novel principle of preventing spherical aberration changes due to temperature variations and to provide a lens system of the type described in the opening paragraph which does not have these drawbacks. According to the invention, the lens system is characterized in that the collimator lens comprises a positive lens element of synthetic material and a negative lens element of glass, the absolute value of the power of the positive lens element being larger than the absolute value of the power of the negative lens element.

For the nominal, or design, temperature of the lens system, the collimator lens ensures that the objective lens is irradiated with a parallel beam. When the temperature changes, for example, at an increase of the temperature, the powerful positive lens having a large negative dn/dT renders the beam slightly divergent because the refractive index n decreases at an increase of the temperature (T). Consequently, the focus of the objective lens moves away from this lens. Due to this focus offset, the radiation paths through the objective lens change, on the one hand, and the magnification of the combination of collimator lens and objective lens changes, on the other hand. Both changes result in a typical change of the spherical aberration. Due to the new composition of the collimator lens, both changes of the spherical aberration largely compensate each other so that the combination of collimator lens and objective lens exhibits a negligible aberration change at a change of the temperature.

A preferred embodiment of the lens system according to the invention is characterized in that the material of the negative lens element has a positive temperature coefficient dn/dT the absolute value of which is smaller then the absolute value of the negative temperature coefficient of the positive lens element.

This yields a better correction for temperature changes. Since the collimator lens comprises a synthetic material element and a glass element, this lens may act, in principle, as an achromatic doublet so that it is also possible with this lens to correct for chromatic aberrations of the objective lens. To this end, the wavelength dispersion of the synthetic material element is preferably as small as possible.

The lens system is preferably characterized in that the two refractive surfaces of the positive lens element are aspherical surfaces.

This measure contributes to the fact that the lens system is well corrected for spherical aberration at the design temperature.

The lens system may be further characterized in that the material of the positive lens element is polycarbonate and the material of the negative lens element is the glass SF11.

This glass has a large refractive index n and a relative large positive dn/dT value, while the synthetic material polycarbonate (PC) has a relatively good optical quality.

However, the lens system is preferably further characterized in that the material of the positive lens element is polymethyl methacrylate and the material of the negative lens element is the glass SF 11.

The synthetic material polymethyl methacrylate has a relative low dispersion factor so that its use enables the collimator lens to satisfactorily fulfil the function of an achromatic doublet.

The invention also relates to an optical scanning device for scanning an information plane. This scanning device, which comprises a radiation source for supplying a scanning beam and a lens system for focusing this beam on the information plane, is characterized in that the lens system is the system described hereinbefore.

The invention also relates to an apparatus for reading and/or writing information in an information plane of an optical record carrier. This apparatus, which comprises an optical scanning device for forming a scanning spot on the information plane, a radiation-sensitive detection system for converting radiation from the information plane into electric signals, and means for moving the scanning spot and the information plane with respect to each other, is characterized in that the optical scanning device is the device mentioned above.

These and other aspects of the invention are apparent from and will be elucidated with reference to the embodiments described hereinafter.

DESCRIPTION OF THE PREFERRED EMBODIMENT(S)

Figure 1:
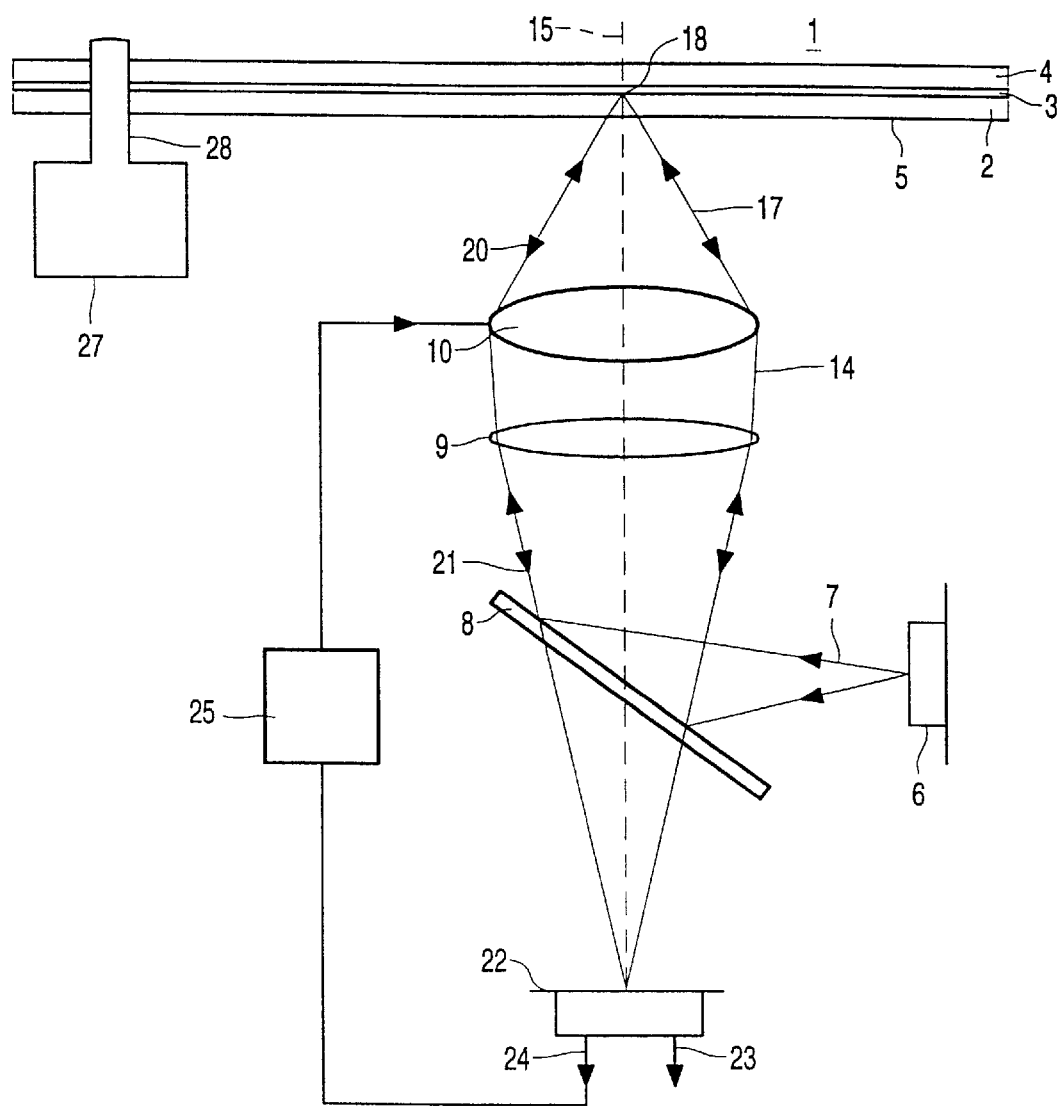
FIG. 1 shows diagrammatically an embodiment of an apparatus for reading and/or writing an optical record carrier provided with an optical scanning device.

FIG. 1 shows a part of a round, disc-shaped record carrier 1 in a radial cross-section. This record carrier has a transparent layer 2, one side of which is provided with an information layer 3. The side of the information layer 3 remote from the transparent layer 2 may be protected from ambient influences by a protective coating 4. The side 5 of the transparent layer 2 facing the scanning device is referred to as the entrance plane. The transparent layer functions as a substrate of the record carrier and constitutes a mechanical support for the information layer. It is alternatively possible that the transparent layer 2 only serves as a protection for the information layer and that the mechanical support is supplied by a layer on the other side of the information layer, for example, by the protective coating 4 or, in the case of a record carrier with two information layers, by the second information layer and a transparent layer provided on the information layer 3. The information may be provided in the form of optically detectable areas in the information layer 3 of the record carrier, which areas are arranged in substantially parallel, concentric or spiral tracks which are not shown in FIG. 1 but are perpendicular to the plane of the drawing in the cross-section shown. The areas may each have an optically detectable shape and may be, for example, pits or areas whose reflection coefficient or direction of magnetization differs from that of the ambience, or a combination of these forms.

The scanning device comprises a radiation source, for example a semiconductor laser emitting a diverging radiation beam 7, the scanning beam. This beam is reflected to a lens system by a beam splitter 8, for example, a semi-transparent mirror. This system comprises a collimator lens 9 and objective lens 10, shown diagrammatically. The collimator lens converts the diverging beam into a collimated beam 14. The objective lens 10, which has an optical axis 15, converts the collimated beam into a converging beam 17 and focuses this beam in a radiation spot 18, the scanning spot, on the information layer 3. The objective lens is shown in the Figure by way of a single lens element but may alternatively comprise a plurality of lens elements as well as a hologram working in transmission or reflection. By using the collimator lens, the object, the emissive surface of the radiation source, and the image, the scanning spot 18, are conjugated at infinity and the objective lens receives a parallel beam.

During writing or reading information, the record carrier is rotated via a shaft 28 driven by a motor 27, so that an information track is scanned by the scanning spot 18. By moving the scanning spot with respect to the record carrier in a direction perpendicular to the plane of the drawing in FIG. 1, all concentric tracks, or the complete spiral track, can be scanned. The last-mentioned movement can be realized by providing the scanning device or a part thereof, including at least the objective lens, on a slide which is movable in said direction. When information is being read, the radiation of the converging beam 17 reflected by the information layer 3 is modulated with the information which is stored in the successive information areas. This reflected radiation constitutes a reflected beam 20 which returns along the path of the projected converging beam 17. The objective lens 10 and the collimator lens 9 convert the reflected and the modulated diverging beam into a converging reflected beam 21, and the beam splitter 8 passes a part of the beam 21 to a radiation-sensitive detection system 21. The detection system converts the radiation of this beam into one or more electric signals. One of these signals is an information signal 23 which represents the information read from the information plane. Another signal is a focus error signal 24 which is representative of a possible axial deviation of the focus 18 with respect to the information plane 3. This focus error signal, which can be generated in various and known manners, is used as an input signal for a focus control circuit 25 which drives an axial actuator (not shown) for the objective lens, such that the axial position of the focus 18 coincides with the plane of the information layer 3. Another signal which is supplied by the detection system is a tracking error signal which is representative of a possible deviation between the center of the scanning spot and the centerline of the instantaneously read information track. This signal, which can also be generated in various and known manners, is used as an input signal for a radial control circuit (not shown) which drives a radial actuator in such a way that the center of the scanning spot 18 coincides with the centerline of the track which has been read.

When information is being written into the information layer, the beam 7 emitted by the source is modulated with the information signal to be written. This modulation may be realized by means of a separate modulator arranged in the path of this beam, for example an acousto-optical modulator which is driven by the information signal to be written, or by direct drive from the source with the information signal to be written. Also when information is being written, the detection system 22 can supply a focus error signal and a tracking error signal. The information signal read from the information layer then comprises, for example, information about data, such as addresses, previously provided on the record carrier and used for writing the actual information.

The objective lens is preferably made of a synthetic material because of the advantages of price and weight of a synthetic material lens as compared with a glass lens. Furthermore, the objective lens preferably has two aspherical refractive surfaces and is designed in such a way that the spherical aberrations introduced by the transparent layer 2 of the record carrier, because the scanning beam is a converging beam in the layer, are corrected. The synthetic material objective lens may be made by means of, for example, a molding process and can be provided with aspherical surfaces in a relatively simple way. When the lens is molded, use is made of dies, with the inner surface of such a die being a negative of the desired lens surface. Known materials for these types of lenses are polymethyl methacrylate (PMMA) or polycarbonate (PC). The formation of aspherical surfaces in synthetic material has the advantage that a cumbersome grinding and polishing process, as would be necessary for a glass lens element, can be dispensed with.

The synthetic material objective lens is, however, sensitive to temperature variations. Particularly the change of the refractive index of the synthetic material occurring at a temperature change causes a change of the optical behavior of the lens. Moreover, a temperature change may also result in a change of the shape of the lens. At the same temperature change, the change of the refractive index has a considerably greater influence on the optical behavior than a change of the shape. The temperature variation predominantly results in a variation of the spherical aberration. A synthetic material objective lens which is designed in such a way that it does not have a spherical aberration at the nominal, or design, temperature will indeed have spherical aberration at a temperature deviating from this nominal temperature, with the size of this aberration being determined by the temperature deviation. The variation of the spherical aberration particularly occurs in projection lenses having a large numerical aperture, for example NA=0.6, which is necessary for reading an optical record carrier having a large information density such as said DVD.

Figure 2:
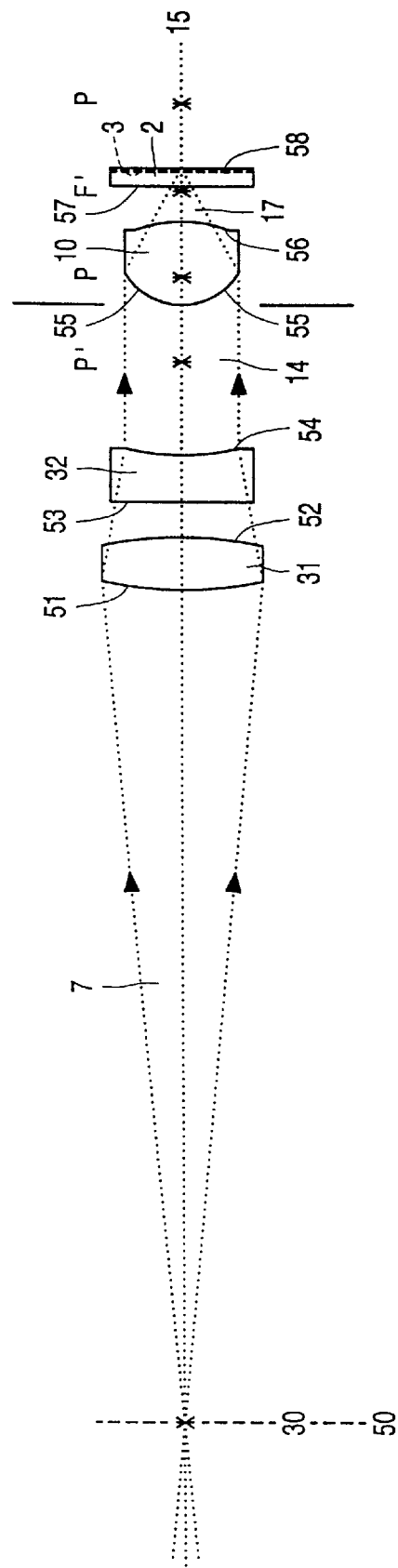
FIG. 2 shows a first embodiment of a lens system according to the invention for this apparatus and this scanning device.

To compensate for the temperature-dependent variation of the spherical aberration of the objective lens, a collimator lens is used according to the invention, which collimator lens is composed of a powerfully positive lens element of synthetic material and a negative lens element of glass. FIG. 2 shows a first embodiment of a lens system according to the invention. In this Figure, the collimator lens is denoted again by the reference numeral 9 and the objective lens is denoted by the reference numeral 10. This Figure also shows the transparent substrate 2 and the information layer 3 of the record carrier. The reference numeral 30 denotes the axial position of the radiation-emissive surface of the radiation source 6. The object main point P, the image main point P', the object focus F and the image focus F' of the objective lens are also shown. The positive synthetic material lens element is denoted by reference numeral 31 and the negative glass lens element is denoted by the reference numeral 32. These lens elements have such a power at the design temperature that they jointly convert the beam from the source into a collimated beam.

The composite collimator lens operates as follows. The powerfully positive lens element 31 having a large negative dn/dT will render the beam 14 slightly diverging, for example, at a temperature increase because the refractive index n then becomes smaller. Consequently, the focus of the beam 17 will be further away from the objective lens 10. This focus change has two effects.

In the first place, the optical paths of the rays through the objective lens change and, due to the refractive index of the synthetic material objective lens which has also changed as a result of the temperature increase, the spherical aberration of this lens changes. At a decrease of the refractive index, there will be positive spherical aberration, which herein means that the border rays of the beam will intersect the optical axis 15 at a point which is further remote from the objective lens than the paraxial focus. The paraxial focus is the point where the paraxial rays extending closely along the optical axis intersect the optical axis. The change of the wavefront ($\Delta W_c$), caused by the refractive index change, of the beam 17 exiting from the lens system 9, 10 is defined in a very good approximation by the expression:

$$\Delta W_c = \Delta n \cdot (D-d) \quad (1)$$

in which D is the geometrical path length of a border ray through the lens and d is the path length of an axial ray. For standard objective lenses, the value D–d is negative and this applies both to the second-degree terms defining the defocusing and to the fourth-degree terms defining the spherical aberration.

In the second place, an offset of the focus has the effect that the magnification of the combination of collimator lens and objective lens changes. Since the objective lens must comply with the Abbe sine condition because it must have a sufficiently large image field, it cannot comply with the Herschel condition outside the paraxial region. The latter condition, described by Herschel in Phil. Trans. Roy. Soc. 111, p. 226, 1821, guarantees that the image will remain sharp if the magnification changes. An objective lens complying with the Herschel condition has, however, a too small image field for use in a scanning device for optical record carriers. The change of the magnification thus leads to a spherical aberration and hence to a wavefront change $\Delta W_{sf}$ defined by:

$$\Delta W_{sf} = -2\Delta z' \cdot \sin^2(\alpha'/2)\left[1 - \frac{((\sin\alpha/2)/\sin(\alpha'/2)))^2}{[(\alpha/2)/(\alpha'/2)]^2}\right] \quad (2)$$

in which $\alpha$ and $\alpha'$ are the angles by which the border rays in the object space and in the image space, respectively, extend to the optical axis. Due to the Abbe sine condition, these angles are related to each other via:

$$\sin \alpha = \beta' \cdot \sin \alpha' \quad (3)$$

in which $\beta'$ is the transverse magnification of the collimator lens and the objective lens combined.

Due to the novel construction of the collimator lens, the two, positive and negative, changes of the spherical aberration largely compensate each other so that the collimator lens and the objective lens combination exhibits hardly any change of aberration at a change of the temperature.

In the embodiment of FIG. 2, the positive lens element 31 is made of PMMA and the negative lens element 32 is made of high-refractive flint glass known by its type name SF11 from the optical glass catalogue of the firm of Schott. The objective lens is made of PMMA. The object focus of the collimator lens is 22.0 mm and the image focus of the objective lens is 3.3 mm. To give an impression of the size of the lens elements and the distance therebetween, a scale gradation of 5 mm is shown in the Figure.

Figure 3:
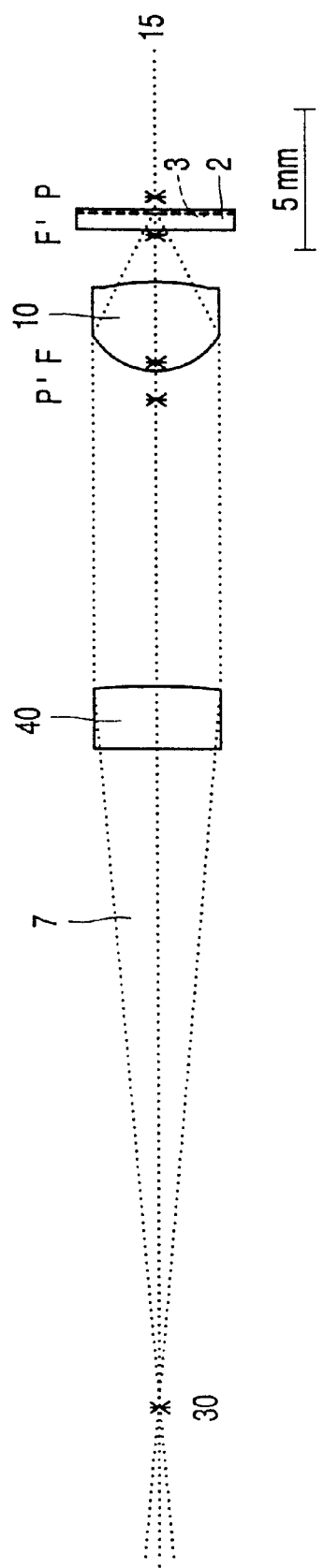
FIG. 3 shows a lens system which is not designed in accordance with the invention.

For the embodiment of FIG. 2, it holds that a spherical aberration change $\Delta OPD=+9.6$ m$\lambda$ occurs at a temperature change of $-30°$ and a spherical aberration change of $-110$ m$\lambda$ occurs at a temperature change of $+30°$. For the sake of comparison, FIG. 3 shows a lens system consisting of a single collimator lens 40 of PMMA and an objective lens 41 also consisting of PMMA, which system is compensated as satisfactorily as possible for temperature variations. The image focus of the objective lens is 3.3 mm again and the object focus of the objective lens is 22.0 mm. The scale of FIG. 3 slightly deviates from that of FIG. 2 as will be apparent from a comparison of the scale gradations. For the system of FIG. 3, it holds that a spherical aberration change $\Delta OPD=+26$ m$\lambda$ occurs at a temperature change of $-30°$ and a spherical aberration change $\Delta OPD=-33$ m$\lambda$ occurs at a temperature change of $+30°$, which aberration changes are considerably larger than those of the lens system of FIG. 2.

In the embodiment of FIG. 2 and the embodiments still to be described, a choice for the glass SF11 has been made as a material for the negative lens element. Instead of this glass, a different glass may be chosen alternatively. The best possible compensation is, however, achieved if the glass element has a positive dn/dT value which is as large as possible. In fact, not only the positive synthetic lens element 31 with a large negative dn/dT but also the negative glass lens element contributes to the temperature compensation of the objective lens 10. Glasses having a high positive dn/dT value are, for example, the high-refractive flint glasses such as the types SF6 or SF11 of the firm of Schott.

Figure 4:
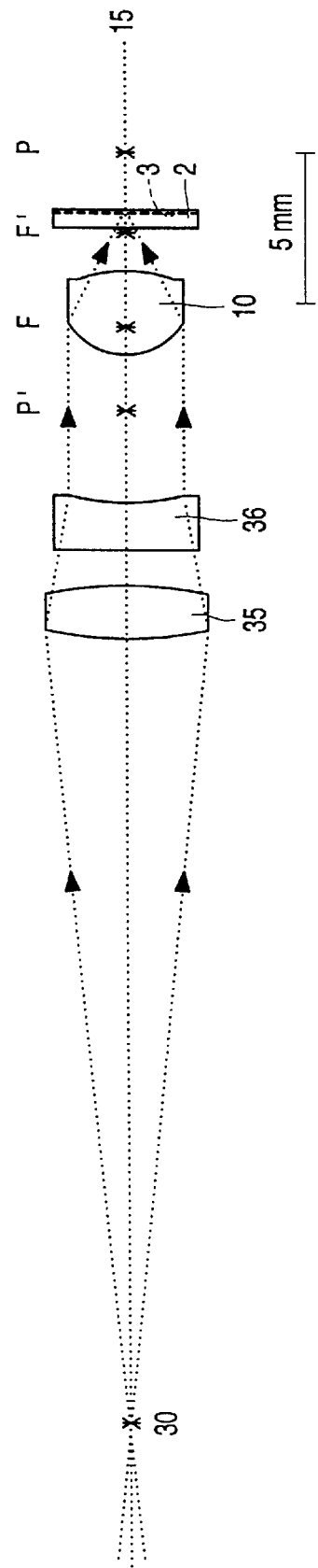
FIG. 4 shows a second embodiment of the lens system according to the invention.

FIG. 4 shows an embodiment of the lens system according to the invention which differs from that of the Figure in that the positive synthetic material lens element 35 is made of PC instead of PMMA. For this embodiment, it holds that a change of the spherical aberration $\Delta OPD=+11.4$ m$\lambda$ occurs at a temperature change of $-30°$ and a spherical aberration change of $-14.3$ m$\lambda$ occurs at a temperature change of $+30°$. These spherical aberration changes are comparable with those of the lens system of FIG. 2.

However, the lens system of FIG. 4 is more sensitive to a focus offset as a result of a wavelength change than the lens system shown in FIG. 2. A wavelength change may occur in a scanning device of the type described here with a diode laser as a radiation source at a variation of the temperature of this laser. The focus offset is predominantly the result of the fact that the single objective lens, which must be as small and light-weight as possible, cannot be corrected for wavelength variations. To decrease this wavelength dependence of the lens system, advantageous use may be made of the fact that the new collimator lens comprises a synthetic material element and a glass lens element. This combination in the collimator lens may fulfil an achromatizing function, provided that the synthetic material lens element has a small, wavelength, dispersion factor dn/d$\lambda$. A material having both a large temperature dispersion factor dn/dT and a small wavelength dispersion factor dn/d$\lambda$ is, for example, PMMA. The material PC does not only have a large dn/dT but also a large dn/d$\lambda$ and is thus less suitable for use in the lens system when wavelength changes must also be compensated. This is illustrated by the fact that, in the design of the lens system shown in FIG. 4 with a PC lens element 35, the focus offset as a result of a wavelength change, dz/d$\lambda$ is equal to 250 nm/nm for the combination of collimator lens and objective lens and is equal to 230 nm/nm for the combination of collimator lens, objective lens and transparent layer 2 of the record carrier, while these values are 105 nm/nm and 125 nm/nm for the design with a PMMA lens element 31 shown in FIG. 2. The lens system of FIG. 2 is therefore a preferred embodiment. The lens system of FIG. 3 is satisfactorily usable if no or only a small wavelength change is to be expected and temperature shifts are not too large.

In the preferred embodiment of FIG. 2, in which the different planes from the object plane to the plane of the information layer 3 are denoted by the reference numerals 50–58, the parameters the axial curvatures C of the planes;

the axial distances di between these planes;

the diameters Di of the beam at the area of these planes, and the refractive indices n have the following values:

| No. | di (mm) | C (mm$^{-1}$) | n | Di (mm) |
|-----|---------|---------------|----------|---------|
| 50 | .0010 | .00000000 | 1.000000 | 5.0000 |
| 51 | 27.7839 | .14720521 | 1.000000 | 5.0000 |
| 52 | 2.0000 | −.09305027 | 1.489314 | 5.0000 |
| 53 | 1.1000 | .00000000 | 1.000000 | 5.0000 |
| 54 | 1.6000 | .12889800 | 1.776660 | 4.0000 |
| 55 | 5.0000 | .49638564 | 1.000000 | 4.0000 |
| 56 | 2.9260 | −.23528084 | 1.488510 | 3.0000 |
| 57 | 1.3500 | .00000000 | 1.000000 | 5.0000 |
| 58 | .600 | .00000000 | 1.580570 | 5.0000 |

The geometrical length of the system is 42.36086 mm and the focal length of the objective lens is 3.3 mm and that of the collimator lens is 22.0 mm.

This lens system has four aspherical surfaces: 51, 52, 55 and 56 which may be characterized by:

$$Z=\Sigma a_{2i} \cdot Y_{2i}$$

Where Y is the perpendicular distance between a point on the aspherical surface and the optical axis, Z is the distance between the projection on the optical axis of this point and the point of intersection of the optical axis with the aspherical surface and $a_{2i}$ are the aspherical coefficients. The values of these coefficients for the different aspherical surfaces are:

| surface 50 | surface 51 |
|------------|------------|
| $a_2$ = .73602605E−01 | $a_2$ = −.46525135E−01 |
| $a_4$ = .16476267E−03 | $a_4$ = .54654947E−03 |
| $a_6$ = −.36851582E−05 | $a_6$ = −.18450681E−04 |
| $a_8$ = −.16673246E−05 | $a_8$ = −.11894212E−05 |

| surface 55 | surface 56 |
|------------|------------|
| $a_2$ = .24818782E−00 | $a_2$ = −.11764042E−00 |
| $a_4$ = .53402346E−02 | $a_4$ = .16022656E−01 |
| $a_6$ = .96736058E−03 | $a_6$ = .14144176E−01 |
| $a_8$ = −.70966426E−03 | $a_8$ = −.16953307E−01 |
| $a_{10}$ = .53389531E−03 | $a_{10}$ = .69994014E−02 |
| $a_{12}$ = −.20281129E−03 | $a_{12}$ = −.10576552E−02 |
| $a_{14}$ = .36004705E−04 | |
| $a_{16}$ = −.24642647E−05. | |

Figure 5:
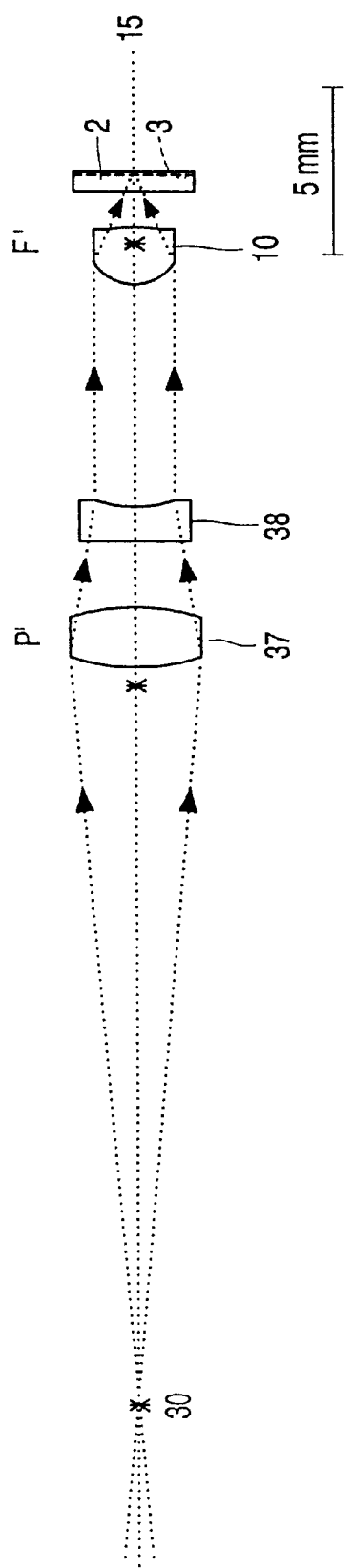
FIG. 5 shows a third embodiment of this lens system.

FIG. 5 shows an embodiment of the lens system whose collimator lens consisting of a positive synthetic material lens element 37 of PMMA and a negative glass element 38 of SF11 gives an excessively strong correction for temperature variations. At a temperature variation of $-30°$, the change of the spherical aberration $\Delta OPD=4.5$ m$\lambda$ and at a temperature variation of +30°, the change of the spherical aberration ΔOPD=−10.3 mλ. However, for this lens system, dz/dλ=155 nm/nm for the combination of collimator lens and objective lens, and dz/dλ=135 nm/nm for the combination of collimator lens and objective lens and transparent layer 2 of the record carrier. The lens system of FIG. 5 is thus slightly less well corrected for wavelength variations than the lens system of FIG. 2. Also in the lens system of FIG. 5, the collimator lens has a focal length of 22.0 mm and the objective lens has a focal length of 3.3 mm.

Figure 6:
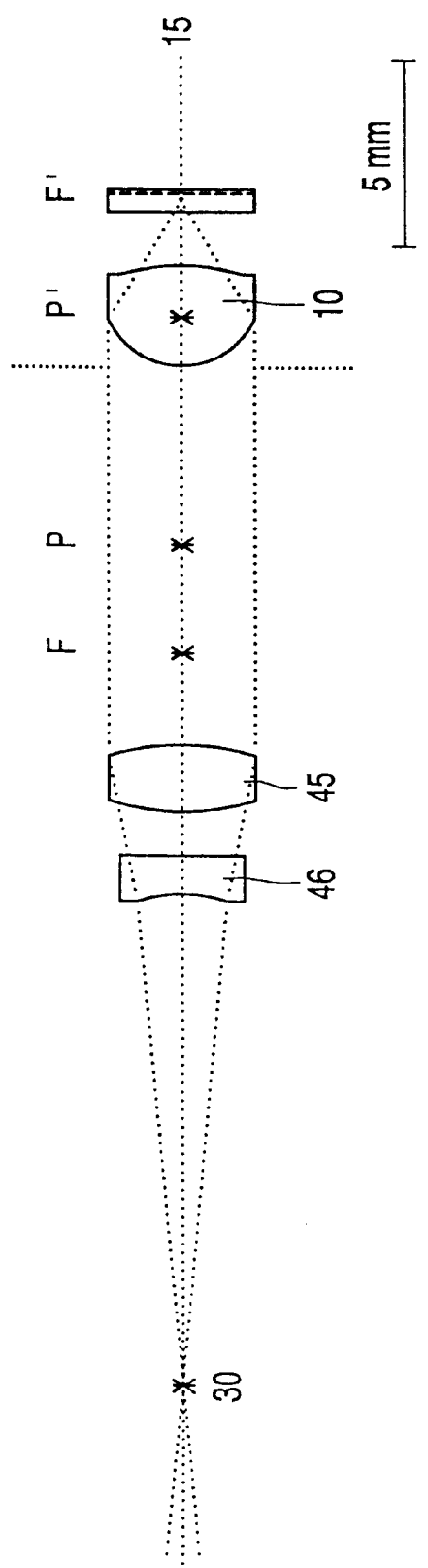
FIG. 6 shows a fourth embodiment of this lens system.

FIG. 6 shows an embodiment of the lens system which is distinguished from the foregoing one in that the positive synthetic material element 45 and the negative glass element have changed places. This system is more compact than that of FIGS. 2, 4 and 5 but has a slightly less satisfactory correction for temperature and wavelength changes. For the system of FIG. 6, it holds that the spherical aberration change ΔOPD=+12.9 mλ for a temperature variation of −30° and the aspherical aberration change ΔOPD=−16.3 mλ for a temperature variation of +30°. Furthermore, dz/dλ=175 nm/nm for the combination of collimator lens and objective lens, and dz/dλ=155 nm/nm for the combination of collimator lens and objective lens and transparent layer 2 of the record carrier.

In the embodiments of the lens system described hereinbefore, the objective lens consists of a single lens element. Such a lens system may have an image aperture up to 0.6 and is suitable for reading an optical record carrier such as a DVD having a considerably higher information density than an audio CD. If the information density is to be further increased so as to record, for example, a digital video signal on an optical record carrier, the numerical aperture of the lens system must be further increased to, for example, NA=0.85. An attractive possibility of increasing the NA without the costs of the objective lens becoming too high and the image field becoming too small is to provide a planoconvex lens element between the actual objective lens element and the record carrier. This planoconvex lens element, also referred to as solid immersion lens or slider lens, may be present at a very short distance from the record carrier but also at a slightly larger distance, for example 300 μm. The converging function of the objective system is then spread across the actual objective lens element and the planoconvex lens element. An advantage of the planoconvex lens element is that this element introduces hardly any aberrations in the radiation beam.

Figure 7:
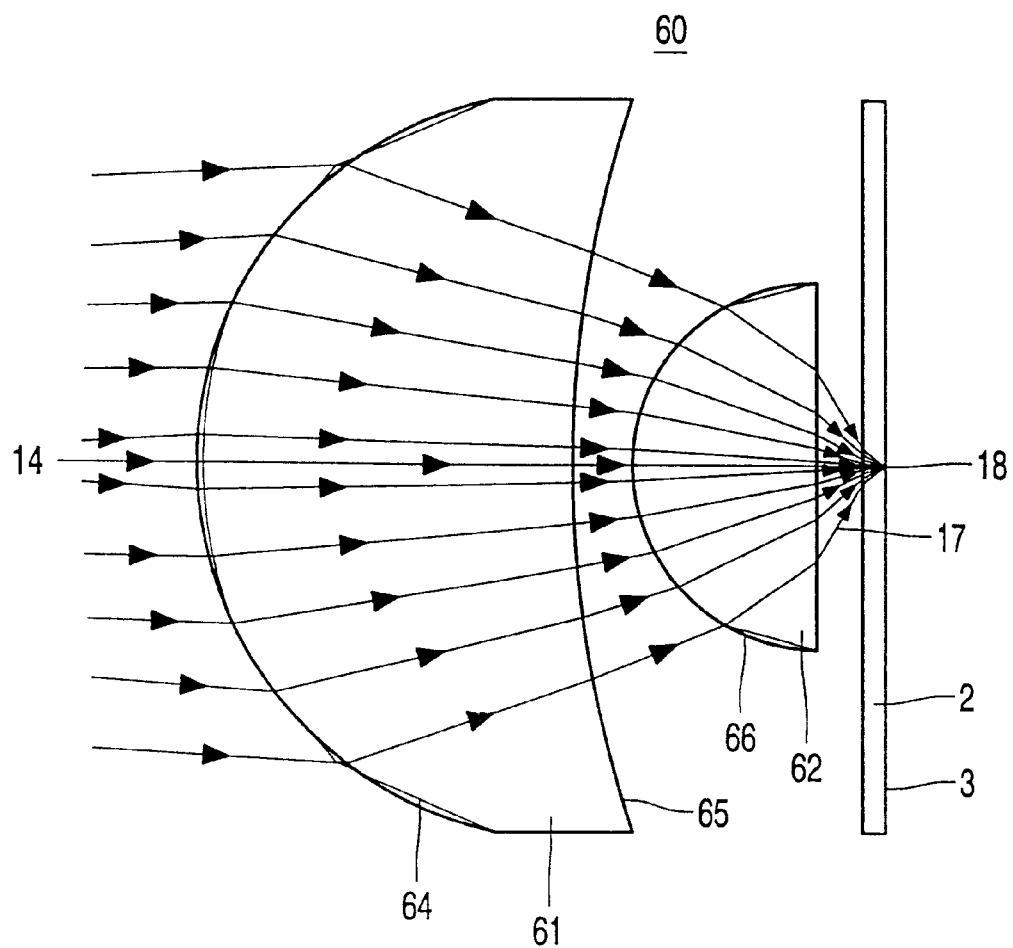
FIG. 7 shows a composite objective lens for use in this lens system.

The invention may be used also in a lens system with such a composite objective lens, i.e. a collimator lens may be used with a positive synthetic material lens element and a negative glass element. By way of illustration, FIG. 7 shows an embodiment of the composite objective lens 60 on a larger scale, as well as the ray paths through this lens. The objective lens element is denoted by the reference numeral 61 and the planoconvex lens is denoted by 62. The lens element 61 may be a planoconvex element with an aspherical surface but, as is shown in FIG. 7, it is preferably a lens element with an aspherical convex surface 64 and an aspherical concave surface 65. The lens element 61 may be designed in known manner in such a way that the spherical aberrations introduced by the planoconvex lens element 62 and the transparent layer 2 can be compensated, so that the scanning beam near the focus, or scanning spot, 18 is essentially free from spherical aberration. The convex surface 66 of the lens element 62 is preferably also aspherical.

Then, the aberration correction can be ensured by a plurality of lens surfaces so that a better and simpler correction becomes possible. For further details of the objective lens with a planoconvex slider lens element, reference is made to EP-A 0 727 777 in which a scanning device provided with such an objective lens is described.

The fact that the invention has been described with reference to its use in an apparatus for reading and/or writing information in an optical record carrier does not mean that its application is limited thereto. The invention may be used wherever scanning must take place at a high resolution, hence with a small scanning spot. Examples are a scanning optical microscope having a very high resolution or optical inspection apparatuses having a high resolution for various applications.

What is claimed is:

1. A lens system for imaging a punctiform radiation source in a diffraction-limited radiation spot in the image plane of the lens system, which system comprises a collimator lens and an objective lens, characterized in that the collimator lens comprises a positive lens element of synthetic material and a negative lens element of glass, the absolute value of the power of the positive lens element being larger than the absolute value of the power of the negative lens element.

2. A lens system as claimed in claim 1, characterized in that the material of the negative lens element has a positive temperature coefficient dn/dT the absolute value of which is smaller then the absolute value of the negative temperature coefficient of the positive lens element, in which n is the refractive index of the material of the relevant lens element and T is the temperature.

3. A lens system as claimed in claim 1, characterized in that the two refractive surfaces of the positive lens element are aspherical surfaces.

4. A lens system as claimed in claim 1, characterized in that the material of the positive lens element is polycarbonate and the material of the negative lens element is the glass SF11.

5. A lens system as claimed in claim 1, characterized in that the material of the positive lens element is polymethyl methacrylate and the material of the negative lens element is the glass SF11.

6. A lens system as claimed in claim 1, characterized in that the objective lens is constituted by a positive convex-concave lens element and, provided on its image side an auxiliary element in the form of a planoconvex lens element.

7. An optical scanning device for scanning an information plane, comprising a radiation source for supplying a scanning beam, and a lens system for focusing the scanning beam to a scanning spot on the information plane, characterized in that the lens system is a system as claimed in claim 1.

8. An apparatus for reading and/or writing information in an information plane of an optical record carrier, comprising an optical scanning device for forming a scanning spot on the information plane, a radiation-sensitive detection system for converting radiation from the information plane into electric signals, and means for moving the scanning spot and the information plane with respect to each other, characterized in that the optical scanning device is a device as claimed in claim 7.

* * * * *